May 10, 1927.

J. H. STOTT 1,628,371

LAMINATED SPRING

Filed July 26, 1926

INVENTOR
John Henry Stott
BY Munn Anderson & Munn
ATTORNEYS

Patented May 10, 1927.

1,628,371

UNITED STATES PATENT OFFICE.

JOHN HENRY STOTT, OF GLEN MAY, ENGLAND.

LAMINATED SPRING.

Application filed July 26, 1926, Serial No. 125,026, and in Great Britain April 27, 1925.

In laminated, or multiple plate, springs as at present manufactured the load deflection diagram is usually a straight line; that is to say the deflection of the springs is always directly proportional to the load and this is always so whether or not the springs bend uniformly throughout their length.

My invention enables laminated springs to be made of which the load deflection diagrams are in the form of curved lines indicating an increase of strength in the springs as the load increases; that is to say, in place of springs showing a constant increment of deflection for a constant increment of load my invention makes it possible to obtain a decreasing increment of deflection for a constant increment of load, and also to reduce weight and cost of manufacture.

As at present manufactured it is impossible to make laminated springs in which the strength increases with the deflection, at a desired rate, so as to be suitable for varying loads (except by the use of additional fittings which increase the cost).

With a straight load deflection line, if the strength of the springs is suitable for light loads it is too weak for the heavier loads, or if the strength of the springs is suitable for the heavy loads it is too strong for the lighter loads.

Further, springs have been designed in such a manner that a group of the shorter spring plates is not brought into action until a later stage of the deflection.

If the plates of such springs are assembled so as to be in direct successive contact at the encastrement there is a gap separating the two groups at the tip of the longest plate of the shorter group. As the tip or eye of the spring is deflected these separated plates will commence to gradually roll into contact at the encastrement end, and should any foreign matter such as small stones or pieces of metal have obtained ingress near the encastrement, during the "open" stage, there will be considerable risk of fracture of one or more plates as it is impossible for them to give way and thereby reduce the strain.

In order to overcome this difficulty it has been proposed to provide a packing piece between two groups of plates so that the two groups cannot come into contact at or near the encastrement.

If the tip gap (or gaps) is left open (and uncontrolled) then the resulting spring is noisy and unsightly owing to the independent vibrations and consequent clashings of such plates as may not be in use at certain periods of the deflection.

Again if central packing pieces are used, to prevent fracture, or contact, of the gap plates at the encastrement end these plates are not "rolling into contact" in the gradual engagement which results in a gradual increase of strength, and, as they approach each other at the tip end, noise or "chattering" is set up, which is objectionable.

According to the present invention the gap provided between a reinforcing plate or group of plates and a main plate or group of plates is bridged by an extended tip on the longest plate of the reinforcing group or by a separate gap spring having a curved load deflection diagram.

In cases wherein the gap spring is formed by an extended or additional tip on the longest of the reinforcing group of plates, the contact area of the tip spring gradually increases and at the same time the pressure intensity gradually increases and the centre of pressure moves towards the encastrement at an ever increasing rate until the gap is closed, (that is until the extended tip bears on the main plate or group of plates at the point where it joins the longest of the reenforcing group of plates, i. e. at the point where the normal or unextended reinforcing plate would end): thereby so proportioning the resistance afforded by the reinforcing plate or group of plates to the load taken by the whole spring that a decreasing increment in deflection of the whole spring is obtained with constant increments of load.

In my invention I cause each plate of the spring to work throughout the full deflection of the spring, governing the closing of the gap (or gaps) by means of a gap spring (or springs) introduced between the separated plates at the tip end of the longest plate of the shorter group.

On the strength and behavior of such gap spring (or springs) depends to a great extent the quality of the resulting load-deflection graduation.

If no gap spring (or springs) is fitted the load-deflection diagram will be such as is represented by two (or more) straight lines inclined at angles corresponding with the two (or more) strengths of the complete spring; or what is commonly known as "dog-legged."

If the gap spring (or springs) has a constant load-deflection ratio, is of such strength as to cause the gap to close at the full spring deflection and is in action throughout the whole deflection, there will be no graduation of the load-deflection ratio and the load-deflection diagram is such as may be represented by a straight line as in the usual design of spring: if the strength of the gap spring (or springs) is halved, and if it acts throughout the whole of the deflection, the load-deflection line again becomes dog-legged, the change in the load-deflection ratio is half of that obtained without using gap springs, and there are abrupt changes in the strength of load-deflection.

If the gap springs are of an increasing load-deflection strength (such as volute springs or conical springs) the resulting load-deflection-line will be of a better character and the strength of the spring will increase so as to show a curved load-deflection-line.

The best gap spring to use is one having a parabolic curve for its load-deflection-line, showing a very slight increase in strength during the early, and a very much greater increase of strength during the later, stages of the deflection; and of such strength that although always in action it does not allow the gap to close until the end of the required deflection.

I may use separate gap springs as described, carried in special clips attached to the plates in any suitable manner, or preferably I may extend the tip of the longest plate of the shorter group so as to form such extended tip into a gap spring of the required nature and bent up so as to be always in contact with the shortest plate of the longer group.

This latter method is certainly the neatest one and should also be the cheapest.

Such extended tip spring is preferably made to decrease rapidly in strength as its end is approached, so that at first it will bend very quickly against its adjacent plate (under a light pressure) and continue "rolling into contact" with it (and increasing in stiffness) until the point of full deflection allows the two plates to come into contact at the usual (unextended) tip bearing portion.

Referring to the drawings:—

Figure 1:
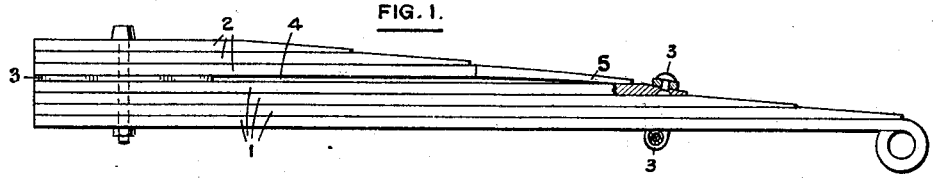
Figure 1 is a view in side elevation showing my invention applied to a quarter elliptic spring in which the plates are drawn as being straight whereas in practice they will be curved and the gap between the extended tip and the adjacent plate of the main group is partially closed.
Figure 2:
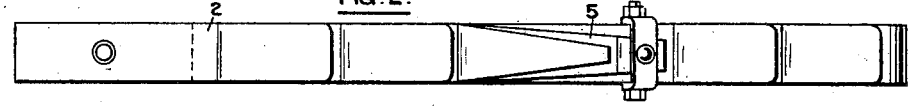
Figure 2 is a plan view corresponding with Figure 1.
Figure 3:
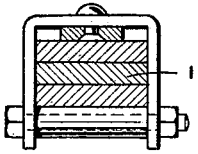
Figure 3 is a sectional view on line 3—3 of Figure 1.

In the construction illustrated in Figures 1–3 the spring comprises a group of four plates 1 of usual thickness, which may be considered to be the main plates of the spring, and a second group of three plates 2 which are preferably of increased thickness and which are the reinforcing plates.

Between the group of plates 1 and the group of plates 2 a gap 4 is formed between the outer end of the group of reinforcing plates and the group of main plates.

A packing plate 3 may be used to prevent foreign matter obtaining ingress near the encastrement.

This gap is closed at the end by an extended tip 5 on the longest of the plates 2.

Figure 8:
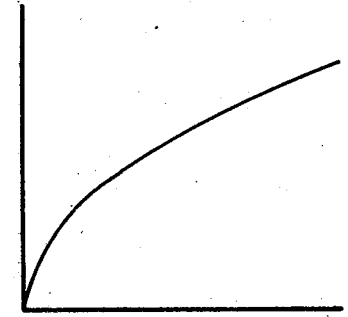
Figure 8 is a diagram showing the load deflection curve of the resilient tip.

As will be seen from Figures 1 and 2, the extended tip 5 tapers in thickness and also in width. This extended tip is preferably designed so that its load deflection curve is in the nature of a parabola as shown in Figure 8, wherein vertical measurements represent deflection and horizontal measurements represent corresponding loads, i. e. with equal increments in load relatively large increases in deflection are experienced at the beginning of bending, but the increments in deflection quickly become less and less as the tip straightens.

Figure 4:
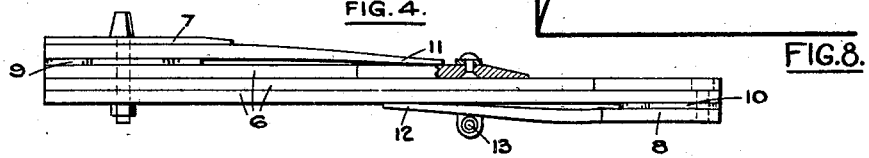
Figure 4 is a view in side elevation showing my invention applied to another form of spring.
Figure 5:
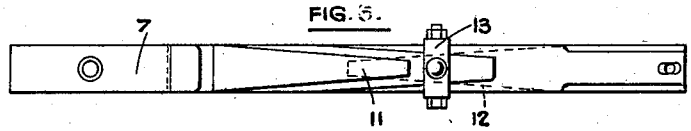
Figure 5 is a plan view corresponding with Figure 4.

In the construction shown in Figures 4 and 5 the spring consists of a group of three main plates 6 having reinforcing plates at both ends.

One pair of reinforcing plates 7 is arranged at the top and a single reinforcing plate 8 is disposed below the axle end of the spring.

Between the group of plates 6 and the pair of plates 7 is a distance plate 9, and between the main plate 6 and the reinforcing plate 8 is a distance plate 10.

The longer of the two plates 7 is provided with an extended tip 11 which tapers both in thickness and width, while the plate 8 is provided with a somewhat similar tapering tip 12.

The extended tip 11 bears upon the upper one of the three plates 6, while the extended tip 12 bears upon the lower one of the three plates 6.

The plate 8 operates in this case to resist torque and it is prevented from separating from the plate 6 during the ordinary working of the spring by a clip 13.

Figure 6:
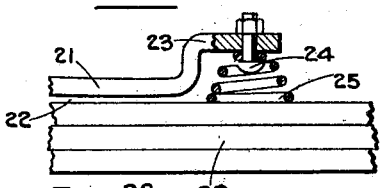
Figure 6 and 7 are elevations of parts of springs showing alternative forms of the invention.

In Figure 6 a portion of three plates 20 forming the main group and the end 21 of a reinforcing plate, or of the longest plate of a reinforcing group, is shown. Between the plate 20 and the end 21 there is normally a gap 22, which may if desired be somewhat larger than as shown in the drawing. The end 21 of the reinforcing plate is provided with an upwardly cranked extension 23 to which is secured, by means of the bolt 24, the smaller end of a conical spring 25. The large end of the spring 25 bears on the main group of plates and thus bridges the gap between them and the reinforcing plate or group so that with increasing loads the reinforcing plate or group is caused to give an increasing amount of support to the main group, the gap 22 becoming closed at or near the fully deflected position of the spring.

Figure 7:
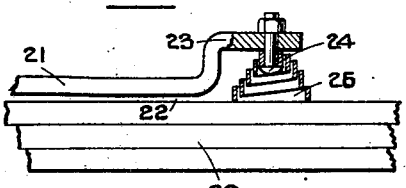

Figure 7 shows a similar construction to that shown in Figure 6 with the exception that a volute spring 26 is employed in place of the spring 25.

My invention enables the whole of the spring plates to be so designed that at the point of maximum deflection they will all have passed through the change of curvature necessary to give a chosen maximum stress in each plate, and preferably such maximum stress should be of a uniform character throughout the length of the plate. This can be ensured by making the overhangs and curvatures in conformity with my British patent numbered 188,428. It prevents plate fracture through plates rolling into contact at the unyielding end adjacent to the encastrement by separating all such plates and keeping them separated, except for such tip portions as may be extended to form gap springs, until gap closes at normal or unextended tip. It avoids noise or chattering. It uses fewer plates than a spring of the same strength of present usual design.

It is not a main spring assisted by an auxiliary spring but is one complete spring with a graded lost-motion character of action incorporated in the tips of the longest plates of the shorter group (or groups); an increase in plate thickness in each shorter group; and with the whole of the individual plates in action throughout the whole of the deflection, with varying rates of changes of curvature between the groups of plates in such a manner as to give any desired variation in increased strength of load-deflection at progressive stages of its deflection.

The encastrement distance (or packing) pieces do not affect the size of the gap between the groups but are such as will give freedom from risk of fractures due to foreign matter, prevent plates rolling on each other, and give a neat appearance without undue depth of the complete spring. The only portions of the separated plates which are allowed to come into contact are the legitimate pressure areas at the tip supports, the full contact over the whole of such tip pressure areas, which roll into contact, being obtained at the position of maximum deflection and for the greater portion of the deflection the load is carried by the gap springs leaving the legitimate pressure areas wholly or partially out of contact.

If foreign substances obtain ingress between the contact areas at the tip end the risk of fracture is negligible as the plates can deflect freely if necessary to overcome such temporary intrusion.

Such an arrangement as described in the preceding statement may be used for laminated springs having all their plates of the same thickness, or graded in decreased thicknesses in the shorter plates, but such a method of manufacture is obviously uneconomical; as the change of curvature decreases in amount in the shorter group (or groups) the stress decreases, and the plate thickness should be increased to raise the stress to a useful amount.

Any or all of the plates of the longest group may be extended in any usual manner, when the spring is used as a quarter-elliptic and is required to take the torque of the road wheel brakes at the tip, without detriment to the remaining shorter portions (which should remain unlengthened).

The graduation of the load-deflection greatly assists in checking any inclination to side rolling, and by keeping both the spring strength and the periodicity of vibration suitable for the loading it also keeps down any tendency to "pitching".

Figure 9:
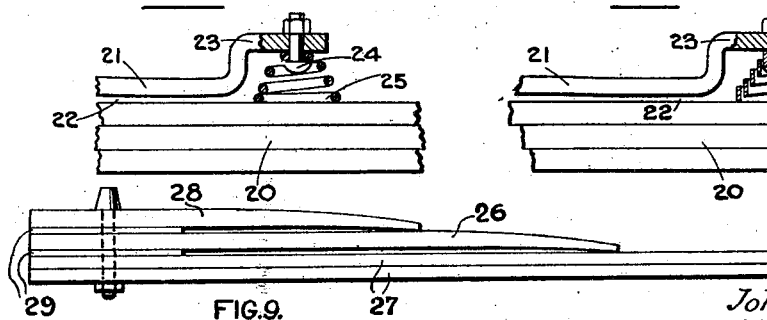
Figure 9 is a view in side elevation showing another form of spring construction in accordance with the invention.

Also a "group" may consist of a single plate; (See Figure 9), the plate 26 being of greater thickness than the preceding longer plate 27 and the plate 28 being thicker than the plate 26, there being a gap between each pair of plates and also an encastrement packing piece 29.

What I claim then is:—

1. A laminated spring comprising a main plate, a reinforcing plate spaced apart from the main plate for a portion of its length near the end of the reinforcing plate, and a spring tip associated with the end of the reinforcing plate, and acting upon the main plate, said tip being of greater resiliency than the reinforcing plate and constructed to provide a progressively increasing resistance to bending with uniform increases in load.

2. A laminated spring comprising a main plate, a reinforcing plate, means for supporting the reinforcing plate in spaced relationship with the main plate for a portion of its length, and a spring tip associated with the end of the reinforcing plate and acting upon the main plate, said tip tapering in width and thickness and constructed to provide a progressively increasing resistance to bending with uniform increases in load.

3. A laminated spring comprising a group of main plates, a group of reinforcing plates, and means for supporting the reinforcing plates in spaced relationship with the main plates for a portion of their length, the end of one of the said reinforcing plates extending into contact with said main plate, said end tapering in width and thickness and constructed to provide a progressively increasing resistance to bending with uniform increases in load.

4. A laminated spring comprising a main plate, a reinforcing plate, and means for supporting the reinforcing plate in spaced relationship with the main plate for a portion of its length, the end of said reinforcing plate extending into contact with said main plate, said end tapering in width and constructed to provide a progressively increasing resistance to bending with uniform increases in load, whereby as the spring is bent the area of contact between the end of the reinforcing plate and the main plate gradually increases, and at the same time the pressure intensity gradually increases and the centre of pressure moves away from the end of the reinforcing plate at an ever increasing rate.

5. A laminated spring comprising a group of main plates, a group of reinforcing plates, means for supporting the group of reinforcing plates in spaced relationship with the group of main plates for a portion of its length, and a spring tip associated with the end of one of the reinforcing plates and acting upon the group of main plates, the thickest plate of the group of reinforcing plates being thicker than the thickest plate of the group of main plates.

In witness whereof I affix my signature.

JOHN HENRY STOTT.